UNITED STATES PATENT OFFICE.

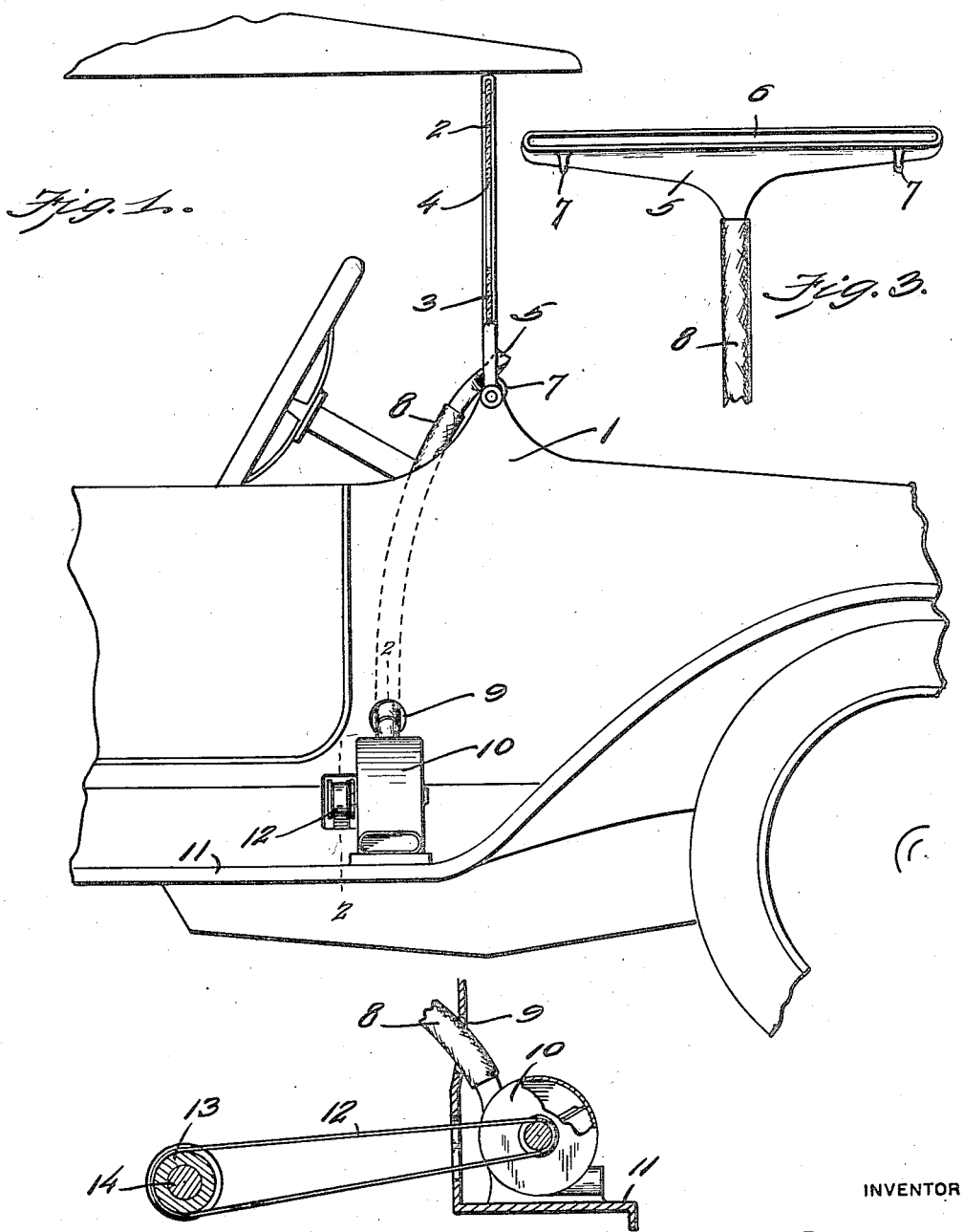

GEORGE A. BLAKE, OF STORRS, CONNECTICUT.

WIND-SHIELD ATTACHMENT.

1,287,846.   Specification of Letters Patent.   Patented Dec. 17, 1918.

Application filed September 19, 1917.   Serial No. 192,160.

*To all whom it may concern:*

Be it known that I, GEORGE A. BLAKE, a citizen of the United States, residing at Storrs, in the county of Tolland and State of Connecticut, have invented certain new and useful Improvements in Wind-Shield Attachments, of which the following is a specification.

This invention is a windshield attachment and has for its principal object the production of a device for permitting the operator behind the windshield to obtain a clear vision therethrough.

Another object of this invention is the production of a windshield attachment which consists of an opening in the windshield while a current of air is passed before the windshield so as to counteract the effect of air passing toward the opening in the windshield, thus preventing the passage of rain or snow and a strong current of air through the opening in the windshield thus permitting the operator to have a clear vision through the shield.

A still further object of this invention is the production of an attachment for a windshield of a motor vehicle, motor car or locomotive or the like, whereby the current of air may be directed before the windshield by a nozzle carried adjacent the opening in the windshield thus preventing the passage of snow or rain as well as the passage of a strong current of air through the windshield.

In addition to the foregoing my invention comprehends improvements in the details of construction and arrangement of the parts to be hereinafter more fully described, and particularly set forth in the appended claims.

One practical form of the present invention is illustrated and described in the present case, while in the accompanying drawings:

Figure 1 is an elevation of the attachment, portions of the windshield being shown in section to illustrate the operation of the device, Fig. 2 is a side elevation partly in section of the means for providing air for the structure, and Fig. 3 is a detail perspective view of the nozzle from which the air is ejected at a point adjacent the windshield.

Referring to the accompanying drawing by numerals, it will be seen that 1 indicates in general an automobile body, although of course it is obvious that the present invention is adapted to be used in connection with locomotives or other cars for preventing the collection of frost or rain upon the windshield and at the same time prevent the passage of a current of air through the opening in the windshield. The windshield 2 is carried by the frame 3 upon the body 1 of the motor vehicle and this windshield 2 is provided with an opening 4 formed therein through which the operator may easily view the roadway in front of the motor vehicle without an obstruction to the vision.

The present device is intended to prevent the passage of an air current through the opening 4 as well as snow or rain and is accomplished by the means hereinafter described.

An elongated nozzle 5 is provided with a slot or opening 6 formed throughout its entirety, while the hooks 7 are also formed upon the nozzle 5. It is therefore obvious that the hooks 7 may be employed for engaging the body 1 or the frame 3 as desired for holding the nozzle 5 in a set position at a point below the opening 4 of the windshield 2. The tube 8 projects through an opening 9 formed in the body 1 of the present illustrated device to be connected to a motor 10 of any suitable construction mounted upon the running board 11. This motor 10 may be driven by a belt 12 connected to the pulley 13 of the drive shaft 14 of the automobile.

It is obvious that when the shaft 14 is rotated, rotary motion will be imparted to the pulley 13 thus causing the strap 12 to operate the motor 10. As the air is drawn from a point exterior to the body 1 of the automobile, it will be forced through the tube 8 with considerable velocity to be exhausted through the slot 6 formed in the nozzle 5. This air current is of sufficient strength to counteract the air current which is caused by the rapid movement of the automobile at a point adjacent the opening 4 formed in the windshield, thus driving back such an air current and preventing the same from blowing through the opening 6 into the face of the operator. It is of course obvious that as the counteracting air current from the nozzle 5 blows in front of the opening 4 of the windshield 2 it will drive the rain and snow away from the opening 4 thus permitting the operator to have an unobstructed vision through this opening.

It is of course obvious that any suitable means desired may be employed for providing the nozzle with air, such for instance as when the device is used upon a locomotive, the tube may be connected to the air line for being provided with the necessary air, without departing from the spirit of the invention.

By referring to the foregoing description it will be seen that a very efficient attachment has been provided for windshield which will constitute an air current protection for the opening through the windshield for the purpose hereinbefore set forth.

It is of course obvious that many minor detail changes may be made in the construction of the present windshield attachment without departing from the spirit of the device and for this reason it is not intended to limit the construction to the specific form herein shown and described as it is intended to include all such forms of the invention as properly come within the scope of the device as claimed.

What is claimed is:

1. A nozzle comprising a narrow body of a length to extend from side to side of an automobile windshield and having a narrow aperture extending the entire length thereof, said body terminating in a pipe connection located at an intermediate point, and a pair of hooks formed integrally with the body and located at its ends to rest upon the dash board of a vehicle.

2. In combination with a motor vehicle including the body, foot board and windshield, the body and windshield having openings, the latter having its opening located adjacent its bottom portion and at a point intermediate its sides, a nozzle located at the lower portion of the windshield and having a pipe connection which extends through the opening, a pair of hooks formed on the nozzle to rest upon the dash board, a blower mounted on the foot board, a hose connection between the blower and nozzle pipe connection, said hose extending through the opening of the body, a pulley for operating the blower, and a driving belt around the pulley and extending through the other opening of the body for connection to the motor.

In testimony whereof I affix my signature in presence of two witnesses.

GEORGE A. BLAKE.

Witnesses:
GEORGE R. BLAKE,
DWIGHT H. HANKS.